Patented Dec. 19, 1944

2,365,190

UNITED STATES PATENT OFFICE 2,365,190

WASHING COMPOSITIONS

George B. Hatch, Pittsburgh, Pa.

No Drawing. Application January 13, 1941,
Serial No. 374,264

14 Claims. (Cl. 252—135)

This invention relates to the conversion of alkali-metal trimetaphosphate to alkali-metal tripolyphosphate and to compositions and processes wherein this conversion is involved.

In Hall Reissue Patent 19,719, reissued October 8, 1935, there are described and claimed water softening and washing processes and compositions involving the use of sodium hexametaphosphate which is sometimes known as Graham's salt or Graham's metaphosphate. The sodium hexametaphosphate is a glassy product which is readily water soluble and has the property of sequestering calcium in a but slightly ionized condition, so that its addition to hard water used in washing processes prevents the formation of insoluble soaps. The sodium hexametaphosphate may be made by drastically chilling a melt made by fusing monosodium dihydrogen orthophosphate.

As a result of this drastic chilling, crystallization is prevented and the product is a glass. If the melt is not rapidly cooled, there is a tendency toward more or less complete crystallization, yielding the water-soluble crystalline form of sodium metaphosphate commonly known as sodium trimetaphosphate. Also the water-soluble crystalline form of sodium metaphosphate can be obtained by dehydrating $NaH_2PO_4$ and annealing the mass between 500° C. to 625° C. For the purpose of conciseness, the water-soluble crystalline form of sodium metaphosphate will be referred to herein as sodium trimetaphosphate. There is some difference of opinion in the literature as to whether this water-soluble crystalline sodium metaphosphate is sodium trimetaphosphate $(NaPO_3)_3$ or sodium monometaphosphate $(NaPO_3)$ but it is believed that the better authority is that it is sodium trimetaphosphate and will be so referred to herein. The water-soluble crystalline sodium metaphosphate is to be distinguished from the water-insoluble crystalline sodium metaphosphate sometimes referred to in the literature as Maddrell salt or sodium monometaphosphate or sodium dimetaphosphate and from the water soluble glassy sodium metaphosphate commonly known as sodium hexametaphosphate or Graham's salt. The sodium trimetaphosphate, although water soluble, does not have the property of sequestering calcium and magnesium in a but slightly ionized form and, therefore, is not suitable for use in water softening or washing or other processes requiring this property.

Sodium tripolyphosphate, $Na_5P_3O_{10}$, which has a molar ratio of $5Na_2O$ to $3P_2O_5$ is a molecularly dehydrated sodium phosphate quite distinct from sodium trimetaphosphate, $(NaPO_3)_3$, which has a molar ratio of $1Na_2O$ to $1P_2O_5$. Sodium tripolyphosphate, which exists not only as the anhydrous compound but may also be recrystallized from aqueous solution as the hydrate, $Na_5P_3O_{10}.6H_2O$, has the property of sequestering calcim in a but slightly ionized form.

It is an object of the present invention to provide a process whereby sodium trimetaphosphate, potassium trimetaphosphate or other alkali-metal trimetaphosphate may be converted into alkali-metal tripolyphosphate which has the property of sequestering calcium in a but slightly ionized form and which, therefore, may be used in water softening and washing compositions and processes and in other places where such property is of advantage. I will refer to sodium trimetaphosphate $(NaPO_3)_3$ and sodium tripolyphosphate $(Na_5P_3O_{10})$ but it will be understood that the corresponding potassium or other alkali-metal phosphates may be used in place of or in addition to the sodium salts.

I have found that sodium trimetaphosphate $(NaPO_3)_3$ may be converted into the useful sodium tripolyphosphate $(Na_5P_3O_{10})$ by dissolving the sodium trimetaphosphate in an aqueous solution of sodium hydroxide. The conversion of the sodium trimetaphosphate into the sodium tripolyphosphate is believed to be represented by the following equation:

EQUATION I

$$(NaPO_3)_3 + 2NaOH = Na_5P_3O_{10} + H_2O$$

The production of sodium tripolyphosphate from sodium trimetaphosphate may be carried out, for example, by dissolving sodium trimetaphosphate in an amount of about 1% by weight in a 10% aqueous solution of sodium hydroxide. After about two hours, hydrated sodium tripolyphosphate having the formula $Na_5P_3O_{10}.6H_2O$ can be precipitated by the addition of alcohol to the solution.

The conversion of sodium trimetaphosphate into sodium tripolyphosphate in a continuous manner may be carried out as follows:

EXAMPLE I

Sodium trimetaphosphate is added to an aqueous solution of sodium hydroxide, the relative amounts of the various ingredients being 10 parts of sodium trimetaphosphate $(NaPO_3)_3$, 2.6 parts of sodium hydroxide and 40 parts of water. Crystals of hydrated sodium tripolyphosphate $(Na_5P_3O_{10}.6H_2O)$ begin to form from the solution in a little more than half an hour after the initial addition of the sodium trimetaphosphate. Three hours after the initial addition a crystal crop of sodium tripolyphosphate may be filtered off which, after drying over night at 100° C., has a weight nearly 70% of the anhydrous sodium trimetaphosphate used as starting material. Further quantities of trimetaphosphate and caustic soda may be added to the motor liquor and further quantities of sodium tripolyphosphate which crystallize out may be separated from the mother liquor and dried. In this manner the process may be carried out indefinitely.

The concentration of the sodium hydroxide in the aqueous solution to which the sodium trimetaphosphate is added influences the rapidity of conversion of the sodium trimetaphosphate into sodium tripolyphosphate. Also the rate of conversion is influenced by the temperature employed.

Where the solution contains sodium hydroxide in amount of about 0.2% and sodium trimetaphosphate in amount of about 0.8%, i. e. a ratio of NaOH to $(NaPO_3)_3$ of about 25%, and the reaction is carried out at room temperature, it takes about 400 hours to carry out the complete conversion of the sodium trimetaphosphate to sodium tripolyphosphate. If the concentration of the sodium hydroxide is increased to about 1% by weight and the sodium trimetaphosphate amounts to 0.8%, i. e. a ratio of NaOH to $(NaPO_3)_3$ of about 125%, then the major portion of the sodium metaphosphate is converted into sodium tripolyphosphate within about 24 hours, although a slow continuous conversion continues for some time thereafter. By carrying out the conversion at higher temperatures and with more concentrated solutions of sodium hydroxide, the time of conversion may be further decreased. Where the temperature of reaction is slightly below 100° C., the process is speeded up greatly but there is a considerable tendency for the sodium tripolyphosphate to be converted by molecular rehydration into sodium orthophosphate which is ineffective in sequestering calcium. Thus where high temperatures are employed, say a temperature slightly below 100° C., the process should not be continued longer than about 7 or 8 hours.

Alkalies other than caustic may be employed for the conversion of alkali trimetaphosphate to alkali tripolyphosphate, for example carbonates, silicates, tribasic orthophosphates, etc. Nor does the alkali have to be a sodium compound, since potassium or calcium hydroxides or other water soluble compounds give similar results.

The discovery that alkali trimetaphosphate can be converted into alkali tripolyphosphate by dissolving it in an alkaline solution containing alkaline hydroxide or other water soluble alkaline compound renders the invention applicable to the use of alkali trimetaphosphate in water softening and washing processes and compositions where alkali hexametaphosphate has been used for sequestering calcium and magnesium. Washing compositions generally contain alkaline detergents, for example caustic soda, soda ash, sodium silicate or trisodium phosphate or the corresponding potassium salts. When used with hard water, these alkaline detergents form precipitates of calcium and magnesium compounds from the calcium and magnesium salts present in the hard water. It has heretofore been suggested in Hall Reissue Patent No. 19,719 to prevent this precipitation of calcium compounds by adding to the washing composition sodium hexametaphosphate which sequesters the calcium or magnesium in but slightly ionized complexes, thereby preventing the formation of insoluble calcium compounds.

According to the present invention, washing compositions may be made containing alkaline detergents such as those above mentioned or other suitable alkaline detergents. The washing composition also contains sodium trimetaphosphate or other alkali-metal trimetaphosphate or mixtures thereof. In using a washing composition containing caustic soda and sodium trimetaphosphate, for example, the caustic soda in solution causes the conversion of the sodium trimetaphosphate into sodium tripolyphosphate, which has the property of sequestering calcium and magnesium in but slightly ionized form, thereby preventing or retarding the precipitation of insoluble calcium and magnesium salts or soaps. If the washing composition contains soda ash or other alkali, the alkali, if present in sufficient amount, is effective in converting the sodium trimetaphosphate into sodium tripolyphosphate.

Examples of various washing compositions in which the values in the table indicate per cent by weight are as follows:

*Table I*

| | $(NaPO_3)_3$ | NaOH | $Na_2CO_3$ | T. S. P. | $Na_2SiO_3$ | $Na_4SiO_4$ | $K_4P_2O_7$ or $Na_4P_2O_7$ | Soap |
|---|---|---|---|---|---|---|---|---|
| 1 | 60-75 | 40-25 | | | | | | |
| 2 | 70 | 30 | | | | | | |
| 3 | 25-50 | | | | | 47-70 | | 2-10 |
| 4 | 35 | | | | | 62 | | 3 |
| 5 | 25-50 | | 75-50 | | | | | |
| 6 | 35 | | 65 | | | | | |
| 7 | 25-50 | | | 10-30 | 40-65 | | | |
| 8 | 35 | | | 20 | 55 | | | |
| 9 | 15-40 | | 25-50 | | | | 10-30 | 5-15 |
| 10 | 30 | | 30 | | | | 30 | 10 |

T. S. P.=trisodium orthophosphate.

Particularly advantageous washing compositions contain an alkaline detergent, alkali trimetaphosphate and alkali hexametaphosphate or other molecularly dehydrated alkali-metal phosphate. Such compositions provide two types of agents for sequestering calcium in but slightly ionized form, one of the agents being immediately available and the other agent becoming only slowly available. Thus consider a composition containing:

EXAMPLE II

| | Per cent |
|---|---|
| Caustic soda | 40 |
| Sodium trimetaphosphate | 30 |
| Sodium hexametaphosphate | 30 |

When this washing composition is added to hard water, the sodium hexametaphosphate is immediately available to sequester the calcium in but slightly ionized form, thereby preventing the precipitation of insoluble calcium compounds. However, sodium hexametaphosphate has a tendency to be converted into sodium orthophosphate by molecular rehydration particularly at elevated temperatures and at high alkalinities.

picity of trimetaphosphate simplifies packaging and permits its use in dry feeding equipment where desired.

Examples of compositions containing the two types of calcium sequestering agents are:

Table II

| | $(NaPO_3)_3$ | $(NaPO_3)_6$ | NaOH | T. S. P. | $Na_3SiO_3$ | $Na_4SiO_4$ | $K_4P_2O_7$ or $Na_4P_2O_7$ | Soap | $Na_2CO_3$ |
|---|---|---|---|---|---|---|---|---|---|
| 1 | 15-40 | 10-35 | 25-50 | | | | | | |
| 2 | 30 | 30 | 40 | | | | | | |
| 3 | 10-30 | 10-30 | | | | 40-70 | | 2-10 | |
| 4 | 20 | 20 | | | | 57 | | 3 | |
| 5 | 10-25 | 10-25 | | 5-15 | 35-75 | | | | |
| 6 | 20 | 20 | | 10 | 45 | | | | |
| 7 | 10-25 | 10-25 | | | | | | | 50-80 |
| 8 | 20 | 20 | | | | | | | 60 |
| 9 | 10-25 | 10-25 | | | 20-55 | | 5-30 | 2-15 | |
| 10 | 20 | 20 | | | 35 | | 20 | 5 | |

T. S. P.=trisodium orthophosphate.

Therefore, after a time the sodium hexametaphosphate is converted into sodium orthophosphate, which does not have the property of sequestering calcium. Sodium trimetaphosphate, however, must be converted into sodium tripolyphosphate, in order to produce a calcium sequestering action. This conversion requires a certain amount of time, depending upon the alkalinity of the washing solution and its temperature. Both increased alkalinity and increased temperature accelerates the conversion of the sodium trimetaphosphate into the sodium tripolyphosphate. Accordingly those conditions which tend to render the sodium hexametaphosphate less effective tend to increase the conversion of the trimetaphosphate into the tripolyphosphate, thereby increasing the effectiveness of the trimetaphosphate or rather the product (sodium tripolyphosphate) resulting from this conversion. There is, therefore, a special advantage in using in the washing composition a material such as sodium hexametaphosphate which is immediately available for sequestering calcium and a material such as sodium trimetaphosphate which becomes effective at a later stage of the process. Thus by this combination at least one of the two calcium sequestering agents is available over a long period of time.

The conversion of sodium trimetaphosphate to tripolyphosphate is accelerated by calcium ion as well as by alkali and temperature. This acceleration of the conversion by calcium ion is particularly advantageous in a washing process, since the ion which we wish to sequester accelerates the conversion of the trimetaphosphate into tripolyphosphate, which will sequester it. The result is that the production of the sequestering agent is automatically accelerated whenever it is needed. This accelerative action of calcium ion is also advantageous when a mixture of a material with an immediate sequestering power, such as hexametaphosphate, is used together with the trimetaphosphate. When reversion of the hexametaphosphate has proceeded sufficiently that not enough remains to tie up the calcium completely, the increase in calcium ion which results accelerates the production of tripolyphosphate from the trimetaphosphate.

An advantage of trimetaphosphate over the hexametaphosphate is that it is not hygroscopic. It can, therefore, be mixed with a number of hydrated alkalies without caking of the mixture, as would occur when hexametaphosphate was used in these mixtures. Further, the non-hygrosco- In place of or in addition to the glassy sodium hexametaphosphate known as Graham's salt, I may use one or more molecularly dehydrated alkali-metal phosphates. The term "molecularly dehydrated alkali-metal phosphate" is intended to include the metaphosphate, tripolyphosphate or pyrophosphate or mixture of any of these phosphates. All of these molecularly dehydrated phoshates may be considered as derived from orthophosphates by the elimination of water of constitution. The molecularly dehydrated phosphates contain less water of constitution than the orthophosphates and have, therefore, come to be recognized as molecularly dehydrated phosphates as pointed out more fully in the Hall and Jackson Patent 1,903,041, granted March 28, 1933. These molecularly dehydrated alkali-metal phosphates provide the quickly available agent for sequestering the calcium and magnesium in but slightly ionized soluble complexes and the sodium or potassium trimetaphosphate provides the more slowly available agent. The particular molecularly dehydrated alkali-metal phosphate which I prefer to use is the glassy sodium hexametaphosphate known as Graham's salt. This material has a ratio of $Na_2O$ to $P_2O_5$ of 1:1. However, other glassy molecularly dehydrated phosphates having somewhat different ratios of $Na_2O$ to $P_2O_5$ than obtain in the sodium hexametaphosphate may be employed. It will be understood that sodium hexametaphosphate is given as representative of the family of glassy molecularly dehydrated phosphates and that other glassy molecularly dehydrated phosphates having a ratio of $Na_2O$ to $P_2O_5$ between 0.9:1 and 1.7:1 may be used in place of or in addition to sodium hexametaphosphate. All of these glassy phosphates have properties which are similar to one another, although differing somewhat in their effectiveness.

In certain washing processes, such for example as those used in the mechanical washing or electrocleaning of dishes, bottles, cans and the like, soap is not ordinarily used because it would lead to objectionable foaming. However, in other cases soap often is employed as, for example, in washing fabrics. According to the present invention, sodium trimetaphosphate may be used in washing compositions which do or do not contain soap. Where soaps are used in the washing compositions or are formed by the reaction of alkali and grease in the washing process, the sodium tripolyphosphate resulting from the conversion of sodium trimetaphosphate prevents the precipitation of insoluble calcium soaps. It is customary in most washing operations to use temperatures of at least 60° C. and preferably in the neighborhood of 100° C. The use of sodium trimetaphosphate in accordance with the present invention may be carried out at these temperatures or at any other suitable washing temperature.

Sodium trimetaphosphate may be used as an addition to soap. The sodium trimetaphosphate is quite stable. It has less tendency to absorb water than does sodium hexametaphosphate and, therefore, may be added to a soap powder without causing material caking of the powder. An example of one such soap composition is:

|  | Per cent |
|---|---|
| $(NaPO_3)_3$ | 15–50 |
| $Na_2SiO_3$ | 10–30 |
| Soap | 25–60 |

When the soap composition is added to hard water, the sodium trimetaphosphate is converted into sodium tripolyphosphate by the sodium silicate, which prevents the precipitation of insoluble calcium soap.

Washing compositions in accordance with the present invention contain about 25 to 75%, preferably about 35 to 65%, of alkali-metal trimetaphosphate and about 25 to 75%, preferably about 35 to 65%, of any suitable alkaline detergent. The most common alkaline detergents are sodium hydroxide, sodium carbonate, trisodium orthophosphate and sodium silicate. The washing composition may or may not contain soap either in small or large amount, according to the particular application of the washing composition.

Where the composition in addition to alkali-metal trimetaphosphate and alkali with or without soap, contains alkali-metal hexametaphosphate or other quickly available calcium sequestering agent, the total of the alkali-metal trimetaphosphate and alkali-metal hexametaphosphate is between about 25 and 70%, preferably between 35 and 65%. The remainder of the composition may be any suitable alkali with or without soap. The alkali-metal trimetaphosphate preferably amounts to at least 50% of the total of alkali-metal trimetaphosphate and alkali-metal hexametaphosphate.

In washing solutions, it is generally not desirable that the pH be below 8.5 in order that the solution be compatible with soap. The original pH of the washing solution containing sodium trimetaphosphate and alkali, for example sodium hydroxide, can be based upon the solution pH after complete conversion of the trimetaphosphate to tripolyphosphate. Taking pH 8.5 as the lower limit desired in the washing solution after the complete conversion of the trimetaphosphate radical to tripolyphosphate radical, the original solution must contain alkalinity in excess of pH 8.5 equivalent to about 85% of the theoretical amount required for the complete conversion of $(NaPO_3)_3$ to $Na_5P_3O_{10}$.

Equation 1 represents complete conversion of $NaPO_3$ to $Na_5P_3O_{10}$, the pH of the solution after complete conversion being about 9.6 to 9.8. It follows that if a final pH of only about 8.5 is required in the washing solution, there will be required less sodium hydroxide than is necessary to completely convert the $NaPO_3$ into $Na_5P_3O_{10}$. As an approximation, it has been found that only about 85% of the amount of sodium hydroxide which would be required for complete conversion of the $NaPO_3$ into $Na_5P_3O_{10}$ will produce a pH of about 8.5 in the final washing solution. Since according to Equation 1, 3 mols of $NaPO_3$ require 2 mols of NaOH for complete conversion to $Na_5P_3O_{10}$, 1 mol of $NaPO_3$ will require 2/3 mol or 0.67 mol of NaOH for the complete conversion. Since, in order to produce a final pH of about 8.5, it is only necessary to use NaOH in the amount of about 85% of that required for complete conversion, 0.6 equivalent of NaOH per mol of $NaPO_3$ will produce a final pH of about 8.5 in the washing solution.

In the case of washing solutions containing both hexametaphosphate and trimetaphosphate, excess alkali must also be present in the original solution to allow for reversion of the hexametaphosphate. In order that the final pH does not drop below 8.5 upon reversion of the hexametaphosphate, sufficient alkali should be present that any orthophosphate formed from the hexametaphosphae will be present as $Na_2HPO_4$. This reversion of hexametaphosphate to orthophosphate may be represented by the following equation, the hexametaphosphate being represented for convenience as $NaPO_3$ rather than as $(NaPO_3)_6$

EQUATION II $NaPO_3 + NaOH = Na_2HPO_4$

According to Equation II, one equivalent of alkali is required per mol of $NaPO_3$ to take care of the reversion of hexametaphosphate to orthophosphate. Thus where the washing solution contains both trimetaphosphate and hexametaphosphate and it is desired to obtain a final pH of 8.5, the original solution should contain a total initial phenolphthalein alkalinity equal to at least 0.6 equivalent per mol of $NaPO_3$ as trimetaphosphate plus 1 equivalent per mol of $NaPO_3$ as hexametaphosphate. As an approximation of this value, the initial total phenolphthalein alkalinity of the washing solution should be equal to about 1 equivalent per mol of total $NaPO_3$.

In the kier boiling of cotton goods, strongly alkaline kier boiling liquors are used at quite high temperatures, for example in the neighborhood of 115° C. to 135° C. Under these conditions, any sodium hexametaphosphate which might be added to the kier boiling liquor is rehydrated rather rapidly into the ineffective sodium orthophosphate. This disadvantage may be overcome by adding sodium trimetaphosphate to the kier liquor. In this manner, the sodium trimetaphosphate is converted into sodium tripolyphosphate, which is effective in suppressing the formation of insoluble calcium and magnesium soaps.

The invention is not limited to the preferred examples, which have been given merely for illustrative purposes, but may be otherwise embodied or practiced within the scope of the following claims.

I claim:

1. A washing composition, comprising an alkali-metal trimetaphosphate and an alkali, whereby when the washing composition is dissolved in water the alkali-metal trimetaphosphate is converted into alkali-metal tripolyphosphate, the alkali being in amount sufficient to product in aqueous solution a pH of at least 8.5 after substantially complete conversion of the trimetaphosphate radical to tripolyphosphate radical.

2. A washing composition, comprising sodium trimetaphosphate and an alkali, whereby when the washing composition is dissolved in water the sodium trimetaphosphate is converted into alkali-metal tripolyphosphate, the alkali being in amount sufficient to produce an initial phenolphthalein alkalinity in aqueous solution of at least 0.6 equivalent per mol of $NaPO_3$.

3. A washing composition, comprising sodium trimetaphosphate, a molecularly dehydrated alkali-metal phosphate other than an alkali-metal trimetaphosphate, said other molecularly dehydrated alkali-metal phosphate being water soluble and capable of sequestering calcium in a but slightly ionized condition, and an alkali, whereby when the washing composition is dissolved in water the trimetaphosphate radical is converted to tripolyphosphate radical; the alkali being in amount sufficient to produce a phenolphthalein alkalinity in aqueous solution before conversion of the trimetaphosphate radical to tripolyphosphate radical of at least 1.0 equivalent per mol of $NaPO_3$.

4. A washing composition, comprising sodium trimetaphosphate, a glassy molecularly dehydrated alkali-metal phosphate having a ratio of alkali-metal oxide to $P_2O_5$ between 0.9 and 1.7:1, and an alkali, whereby when the washing composition is dissolved in water the trimetaphosphate radical is converted to tripolyphosphate radical, the alkali being in amount sufficient to produce a phenolphthalein alkalinity in aqueous solution before conversion of the trimetaphosphate radical to tripolyphosphate radical of at least 1.0 equivalent per mol of $NaPO_3$.

5. A washing composition, comprising sodium hexametaphosphate, sodium trimetaphosphate and an alkali, whereby when the washing composition is dissolved in water the trimetaphosphate radical is converted into tripolyphosphate radical, the alkali being in amount sufficient to produce a phenolphthalein alkalinity in aqueous solution before conversion of the trimetaphosphate radical to the tripolyphosphate radical of at least 1.0 equivalent per mole of $NaPO_3$.

6. The process of making a washing solution which will sequester calcium, which comprises dissolving in water an alkali-metal trimetaphosphate and an alkali, whereby the trimetaphosphate radical is converted to tripolyphosphate radical, the alkali being in amount sufficient to produce in the aqueous solution a pH of at least 8.5 after substantially complete conversion of the trimetaphosphate radical to tripolyphosphate radical.

7. The process of making a washing solution which will sequester calcium, which comprises dissolving in water sodium trimetaphosphate and an alkali, whereby the trimetaphosphate radical is converted to tripolyphosphate radical, the alkali being in amount sufficient to produce in the aqueous solution a pH of at least 8.5 after substantially complete conversion of the trimetaphosphate radical to tripolyphosphate radical.

8. A washing solution which maintains its efficiency in sequestering calcium over a long period of time, said washing solution being an aqueous solution comprising water and a molecularly dehydrated alkali-metal phosphate which is substantially immediately effective in sequestering calcium, an alkali-metal trimetaphosphate and an alkali, whereby over a period of time the trimetaphosphate radical which is incapable of sequestering calcium is converted to tripolyphosphate radical which is capable of sequestering calcium, the alkali being in amount sufficient to produce before conversion of the trimetaphosphate radical to tripolyphosphate radical a phenolphthalein alkalinity of at least 1.0 equivalent per mol of total $NaPO_3$.

9. A washing solution which maintains its efficiency in sequestering calcium over a long period of time, said solution being an aqueous solution comprising water and sodium hexametaphosphate which is substantially immediately effective in sequestering calcium, an alkali-metal trimetaphosphate and an alkali, whereby over a period of time the trimetaphosphate radical which is incapable of sequestering calcium is converted to tripolyphosphate radical which is capable of sequestering calcium, the alkali being in amount sufficient to produce before conversion of the trimetaphosphate radical to tripolyphosphate radical a phenolphthalein alkalinity of at least 1.0 equivalent per mole of total $NaPO_3$.

10. A washing solution which maintains its efficiency in sequestering calcium over a long period of time, said solution being an aqueous solution comprising water and a glassy molecularly dehydrated alkali-metal phosphate having a ratio of alkali-metal oxide to $P_2O_5$ between 0.9:1 and 1.7:1 which is substantially immediately effective in sequestering calcium, an alkali-metal trimetaphosphate and an alkali, whereby over a period of time the trimetaphosphate radical which is incapable of sequestering calcium is converted to tripolyphosphate radical which is capable of sequestering calcium, the alkali being in amount sufficient to produce before conversion of the trimetaphosphate radical to tripolyphosphate radical a phenolphthalein alkalinity of at least 1.0 equivalent per mol of total $NaPO_3$.

11. A washing composition comprising about 25 to 75% of an alkali-metal trimetaphosphate and about 25 to 75% of an alkaline detergent.

12. A washing composition comprising about 35 to 65% of an alkali-metal trimetaphosphate and about 35 to 65% of an alkaline detergent.

13. A washing composition comprising
 (a) an alkali-metal trimetaphosphate
 (b) a glassy molecularly dehydrated alkali-metal phosphate having a ratio of alkali-metal oxide to $P_2O_5$ between 0.9:1 and 1.7:1
 (c) an alkaline detergent other than (a) or (b), the proportions of said ingredients being by weight about
 $(a)+(b)=25$ to 70%
 $(c)=30$ to 75%
 $(a)=$ at least 50% of $(a)+(b)$.

14. A washing composition comprising
 (a) sodium trimetaphosphate
 (b) sodium hexametaphosphate
 (c) an alkaline detergent other than (a) or (b) the proportions of said ingredients being by weight about
 $(a)+(b)=25$ to 70%
 $(c)=30$ to 75%
 $(a)=$ at least 50% of $(a)+(b)$.

GEORGE B. HATCH.

CERTIFICATE OF CORRECTION.

Patent No. 2,365,190. December 19, 1944.

GEORGE B. HATCH.

It is hereby certified that error appears in the printed specification of the above numbered patent requiring correction as follows: Page 1, second column, line 8, for "calcim" read --calcium--; page 2, first column, line 9, for "motor" read --mother--; page 4, second column, line 17-18, for "hexametaphosphae" read --hexametaphosphate--; page 5, first column, line 41, claim 5, and second column, line 22, claim 9, for "mole" read --mol--; and that the said Letters Patent should be read with this correction therein that the same may conform to the record of the case in the Patent Office.

Signed and sealed this 15th day of May, A. D. 1945.

Leslie Frazer (Seal)                      Acting Commissioner of Patents.